March 29, 1949.　　　　W. F. H. BRAUN　　　　2,465,707
GEAR CUTTING MACHINE

Original Filed Jan. 29, 1944　　　　　　　　　　4 Sheets-Sheet 1

INVENTOR
William F. H. Braun
BY Augustus B. Stoughton
ATTORNEY.

WITNESS:
Robt. P. Kitchel.

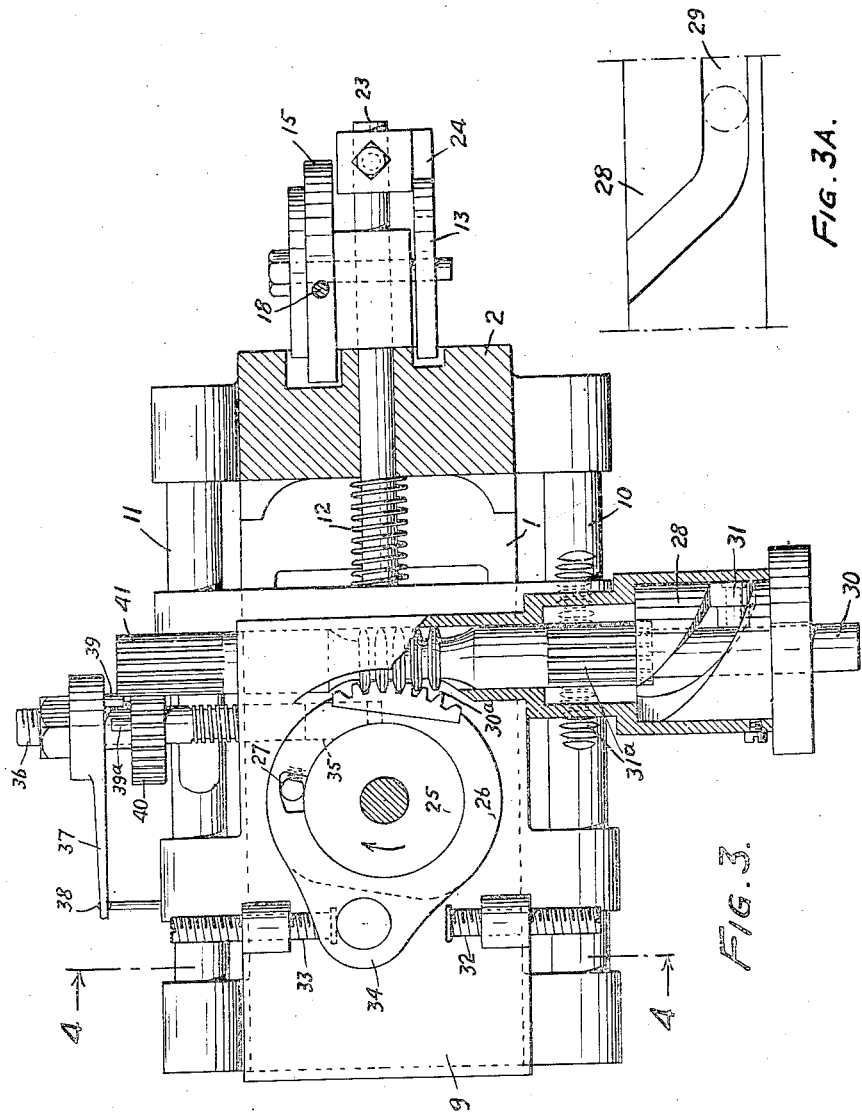

March 29, 1949. W. F. H. BRAUN 2,465,707
GEAR CUTTING MACHINE
Original Filed Jan. 29, 1944 4 Sheets-Sheet 4

WITNESS:
Rob R Kitchel

INVENTOR
William F. H. Braun
BY
Augusto B. Stoughton
ATTORNEY.

Patented Mar. 29, 1949

2,465,707

UNITED STATES PATENT OFFICE 2,465,707

GEAR CUTTING MACHINE

William F. H. Braun, Philadelphia, Pa.

Substituted for application Serial No. 520,145, January 29, 1944. This application April 2, 1947, Serial No. 738,849

5 Claims. (Cl. 90—10)

This invention relates to improvements in machines for cutting gears, this application being a substitute for my previously filed application, Serial No. 520,145, filed January 29, 1944, now abandoned.

Objects of the present invention are to provide a comparatively inexpensive machine for cutting gear teeth; to provide for adjusting the machine to cut different numbers of teeth; to insure accuracy of the teeth; and, generally, to provide a comparatively simple, compact and reliable gear cutter which can be manufactured at relatively small cost.

Other objects of the invention will appear from the following description at the end of which the invention will be claimed.

The invention consists in the improvements to be presently described and finally pointed out in the claims.

In the following description, reference will be made to the accompanying drawings forming part hereof and in which:

Figure 3 is a sectional view taken on the line 3—3 of Figure 1;

Figure 3A is a view illustrating a development of the cam shown in Figure 3;

Figure 2:
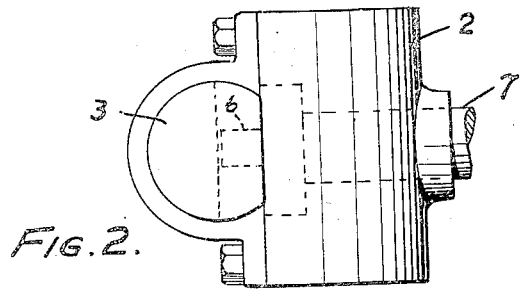
Figure 2 is a detached plan view of the upper part of the same.
Figure 1:
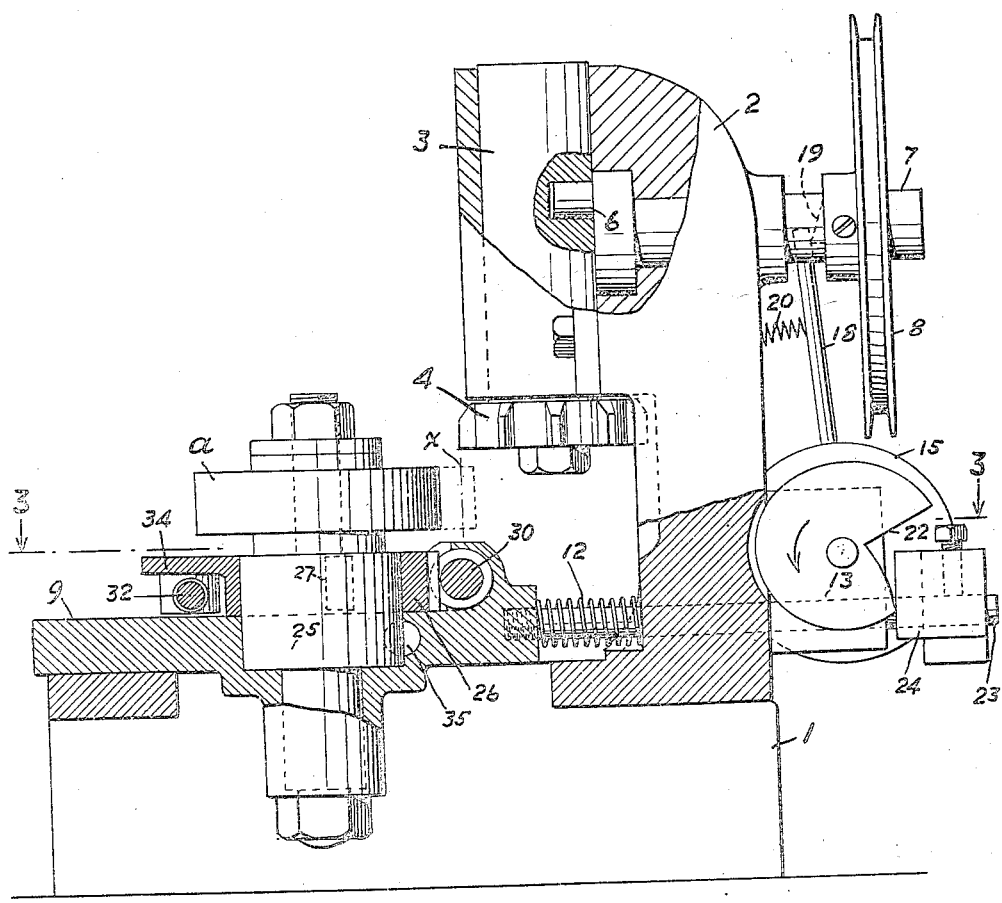
Figure 1 is an elevational view, partly in section, of a gear cutter embodying features of the invention.
Figure 4:
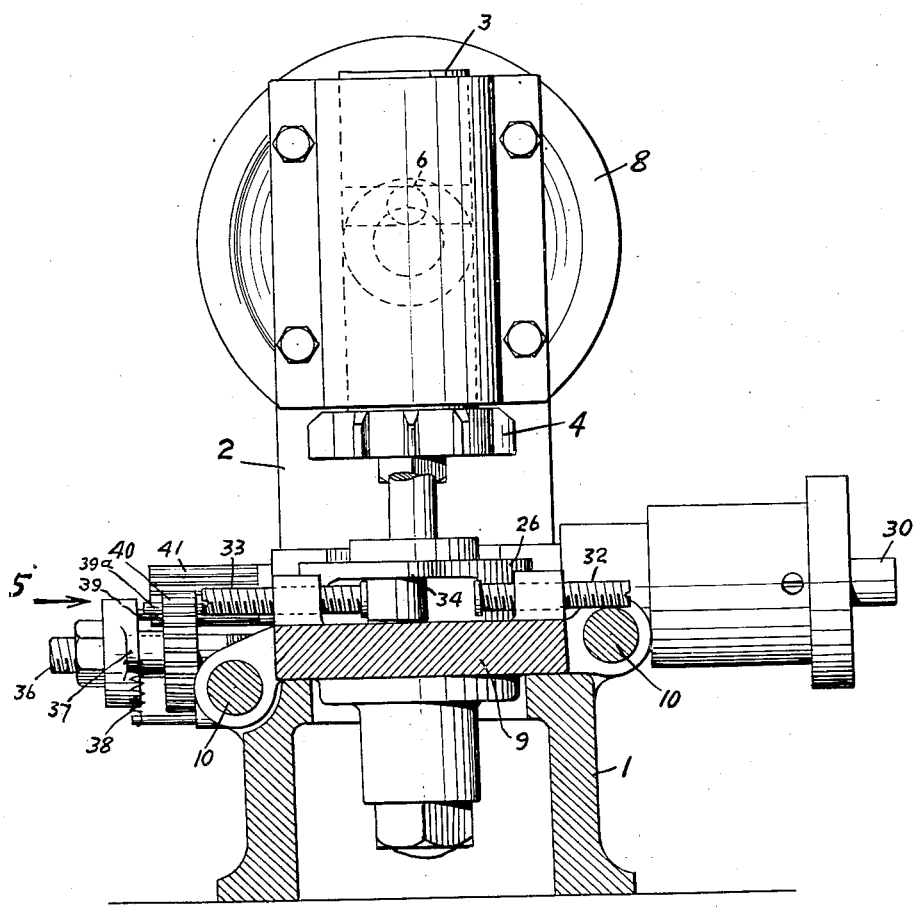
Figure 4 is a sectional elevational view taken on the line 4—4 of Figure 3.
Figure 8:
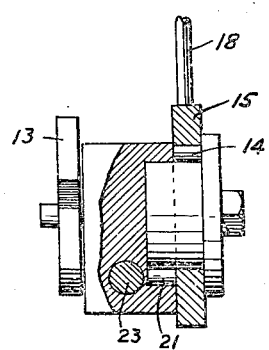
Figure 8 is a side view partly in section of parts shown in Figure 7.
Figure 7:
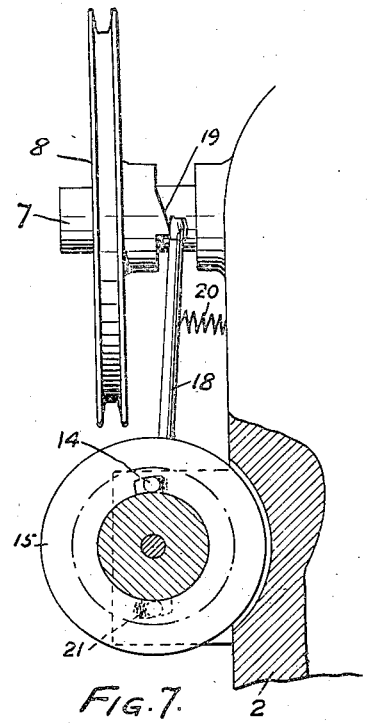
Figure 7 is a view partly in section of parts shown at the right-hand in Figure 1, looking from the back toward the front of the machine in Figure 1.

Referring to the drawings, 1 is a fixed support provided with an upstanding portion 2. 3 is a cutter bar mounted on the upstanding portion 2 of the support for endwise reciprocation in a vertical direction. 4 is a disk mounted on the lower end of the cutter bar and having radially projecting cutters contoured and spaced appropriately for cutting different numbers and sizes of teeth on gear wheel blanks $a$. Ordinarily, the disk 4 is fixed against rotary movement in respect to the bar. The cutter bar is reciprocated by a crank mechanism 6 mounted on a shaft 7 provided with a driving pulley 8. In the operation of the machine, the reciprocation of the cutter disk 4 is continuous so that one of its cutters is reciprocated in a straight vertical path as indicated at $x$ in Figure 1. 9 (Figure 4) is a carrier mounted for reciprocation on guide rods 10 carried by the support. 12 is a compression spring interposed between the carrier and the portion 2 of the support and urging the carrier, with a quick return motion, toward the left as shown in Figure 1, and away from the direction indicated by the line $x$ in Figure 1. 13 (Figure 1) is an edge cam turnably mounted on the support and to be hereinafter described and it is rotated from the shaft 7 by means of a ball-clutch 14 (Figures 7 and 8), of which the strap 15 is provided with an arm 18 moved in one direction by a crown cam 19 on the shaft 7 and in the other direction by a spring 20 interposed between the arm and the support 2. 21 is a holding detent of the roller type. Through the intervention of the mechanism last described, the cam 13 is rotated with a step-by-step motion continuously in one direction as indicated by the arrow in Figure 1. The high part of the cam 19 is so located that the cam 13 is turned when the cutter 4 is in elevated position as shown in Figure 1 and is clear of the work. The cam 13 is partly spiral in outline and it is provided with a V-shaped low part 22. The total rise in the spiral portion of the cam controls and corresponds to the full depth of the teeth to be cut. 23 is a rod connected with the carrier 9 and it is provided with a transversely disposed cam-follower 24, the latter being adjustably mounted on the rod 23 by means of a set-screw. This adjustment fixes the limit of travel of the work towards the cutter. The cam 13 serves to draw the carrier 9 on the guide rods 10 and 11 toward the right in Figure 1 with a slowly advancing motion so as to bring the blank $a$ gradually into line with the travel $x$ of the reciprocating cutter, and then, when the follower 24 enters the V-shaped portion of the cam 13, the spring 12 returns the carrier, with a relatively quick motion, to substantially its position shown in Figure 3. The head 25 is rotatably mounted in the carrier 9 and is adapted to hold the gear blank $a$. 26 (Figure 3) is a circular strap or yoke rotatably mounted on the head 25 and provided with ball-clutch mechanism 27 by means of which the head and work are intermittently advanced or turned in one direction. 28 is a barrel cam held against rotation and adjustably mounted on the carrier. This cam 28 is provided with a relatively long circumferential grooved portion 29 (Figure 3A). 30 is a shaft mounted for endwise motion crosswise of the carrier and provided with a cam-follower 31 co-operating with the cam 28. The cam 28 is so circumferentially adjusted that the cam-follower 31 travels in its straight portion 29 when the carrier is moving towards the cutter under the action of the cam 13. This shaft 30 has rack-and-pinion engagement 31ª with the fixed rod 10 so that the shaft is rotated when the carrier is moved. Between the shaft 30 and the yoke 26 there are engaging teeth 30ª circular in contour and which permit the shaft to rotate freely without moving the yoke while the follower 31 is in the circumferential portion 29 of cam 28 and which cause the shaft to turn the yoke when the shaft is moved endwise by the cam 28. When the carrier is moved toward the left, the yoke 26 is turned freely. On the return motion, the yoke 26, through the ball-clutch 27, turns the gear blank a into position for cutting an additional tooth on the blank. 32 and 33 are micrometer screws which limit the turning movement of the yoke 26 because they are in range of a radial projection 34 on the yoke 26 so that, when the projection 34 abuts on the micrometer screw 32, the ball-clutch 27 lets go and the head 25 is at rest in position for presenting a blank in order that an additional tooth may be cut in the manner hereinabove described. The micrometer screws 32 and 33 are aligned and the lines in which their ends lie are perpendicular to the horizontal in Figure 3. The micrometer screw 32 operates to position the carrier at rest against the force of the spring 12.

Figure 5:
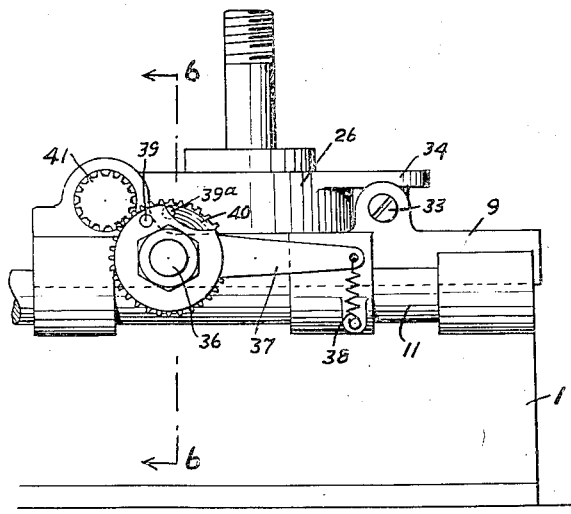
Figure 5 is a detail view looking in the direction of the arrow 5 in Figure 4.
Figure 6:
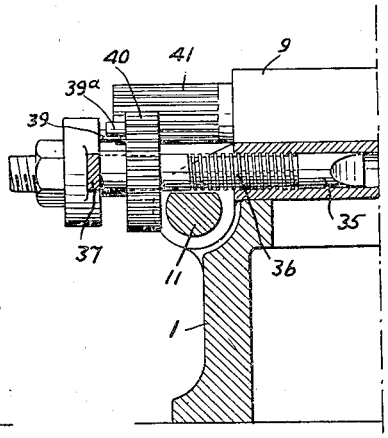
Figure 6 is a transverse sectional view taken on the line 6—6 of Figure 5.

35 (Figure 6) is a bolt which, when the head has been advanced for cutting an additional tooth, locks the head in that position during the cutting operation. The end of the bolt is shaped to conform to the surface of the head 25 with which it co-acts. The head of the bolt 35 does not rotate. However, the shank 36 of the bolt does rotate, there being a connection between the parts which permits of this rotation. The shank 36 is screw-threaded in relation to the carrier and it is provided with an arm 37 (Figure 5) which is provided with a pin 39, which co-operates with a pin 39ª on the gear-wheel 40 driven by an elongated gear 41 on the shaft 30 so that, when the pins 39 and 39ª are in engagement, the shank 36 is withdrawn, releasing bolt 35; and, when the pins are disengaged, the bolt is projected by the action of the spring 38.

The mode of operation may be described as follows:

Assuming that a tooth has been cut in a manner which will be described, the follower 24 is at the notch 22 in the cam 13 and the spring 12 is about to move the carrier 9 toward the left in Figure 1 with a quick motion. The follower 31 is in the straight part 29 of the cam (Figure 3A). The projection 34 is in contact with the micrometer screw 33 and the head 25 is locked by the bolt 35. As the carrier moves toward the left, the shaft 30 undergoes a movement of rotation by the teeth 31ª and an endwise motion by the curved part of the cam 28 acting on the follower 31. The motion of rotation of the shaft 30 releases the bolt 35 and the endwise motion of the shaft 30 turns the strap or yoke 26 counter-clockwise without turning the head 25 by reason of the release of the ball-clutch 27 until the projection 34, contacting with the end of the micrometer screw 32, brings all the parts to rest against the pressure of the spring 12. The blank a is ready to present an uncut portion of its periphery to the cutter 4; then the follower 24, reaching the high part of the cam 13, draws the carrier toward the right in Figure 1 against the force of the spring 12.

This movement of the carrier toward the right causes rotation of the shaft 30 by the rack-and-pinion connection 31ª in the opposite direction, causing the follower 31 to reach the straight portion 29 of the cam 28 and also causing the projection on the strap or yoke 26 to abut on the micrometer screw 33. Thus the yoke or strap 26 is turned through the action of the ball-clutch 27 into position for presenting an uncut portion of the blank a to the cutter. During the occurrence of these operations, the bolt 35 is operated in the manner described to lock the head in its new position. The continued motion of the carrier induced by the cam 13 brings the blank a into contact with the cutter 4, which operates to cut a new tooth, the blank being fed toward the cutter gradually and intermittently by the spiral portion of the cam 13. It may be remarked that the cam 28 is carefully adjusted in respect to the micrometer screws 32 and 33; and that the cam-follower 31 occupies the straight portion of the cam 29 during the forward and return motion of the carrier.

Descriptively, it may be said that the blank a is accurately positioned for cutting teeth of uniform pitch by the setting of the micrometer screws 32 and 33 and by the corresponding adjustment of the position of the straight portion of the cam 29, which insures the maintenance of that setting.

It will be obvious to those skilled in the art to which the invention relates that modifications may be made in details of construction and in matters of mere form hence the invention is not limited thereto or otherwise than the appended claims may require.

What is claimed as new and useful is:

1. An improvement in machines for cutting gear teeth including a support, a reciprocating cutter and a carrier mounted on the support for movement in a direction crosswise of the path of the cutter and provided with a turnably mounted gear blank carrying head, said improvement comprising in combination a shaft endwise movably and turnably mounted on the carrier, rack-and-pinion connection between the shaft and support for turning the shaft, a cam mounted on the carrier and having a groove engaging a follower provided on the shaft and shifting the shaft endwise with a dwell in its movement, mechanism including a clutch of the ball type interposed between the shaft and head and turning the latter in the same direction with a step-by-step movement upon endwise movement of the shaft, aligned micrometer screws positioned for causing engagement and disengagement of the clutch mechanism and thereby stopping and starting the rotation of the head, a spring-pressed bolt locking the head against rotation while a tooth is being cut, mechanism actuated by rotation of said shaft and operative to release the bolt to permit turning movement of the head into position for cutting an additional tooth.

2. An improvement in machines for cutting gear teeth including a support, a reciprocating cutter and a carrier mounted on the support for movement in a direction crosswise of the path of the cutter and provided with a turnably mounted gear blank carrying head, said improvement comprising in combination, a shaft mounted on the carrier and rotatable and endwise movable, toothed gearing between the shaft and support to rotate the shaft, a cam device between the shaft and carrier shifting the shaft endwise, a clutch of the ball type engaging the head and having a yoke oscillated by endwise movement of the shaft, means for limiting the movement of the yoke, thereby disengaging and engaging the clutch, devices locking the head and responsive to endwise movement of the shaft, and mechanism for actuating said parts.

3. A fixed support, a cutter bar mounted on the support for endwise reciprocation in a vertical direction, a disk mounted on the end of the cutter bar and having radially projecting cutters contoured and spaced appropriately for cutting different numbers of teeth on gear wheel blanks, a reciprocating carrier mounted on the support and spring-pressed out of line with the travel of the cutter, a cam rotatably mounted on the support and partly spiral in outline and having a V-shaped low part, a rod connected with the carrier and having a transversely disposed cam-follower co-operating with the cam, a head adapted to hold a gear blank and rotatably mounted on the carrier, a circular yoke turnably mounted on the head, a ball-clutch between the yoke and head turning the head with a step-by-step intermittent motion, a fixed barrel cam having a relatively long circumferential groove portion and fixedly mounted on the carrier, an endwise movable shaft mounted on the carrier and provided with a cam-follower for the last-mentioned barrel cam and having a rack-and-pinion connection with the fixed support, a rotatable and endwise relatively immovable connection between the yoke and shaft, a locking mechanism for the yoke having gear-wheel connection with said shaft, micrometer screws for limiting the throw of the yoke, a power-driven shaft having a driving cam, a spring-pressed follower, a ball-clutch between the follower and the spiral cam, and transmission mechanism interposed between the driving shaft and cutter bar.

4. An improvement in machines for cutting gear teeth including a support, a reciprocating cutter and a carrier movably mounted on the support and provided with a turnable gear blank carrying head, said improvement comprising, in combination, a spring stressing the carrier toward retracted position, mechanism including micrometer screws for arresting the travel of the carrier and for turning said head into a new tooth-cutting position, cam means for advancing the carrier with its head in the new position into the range of the cutter, and a second cam means having a comparatively long straight portion and a follower constructed and arranged to oppose movement of said mechanism when the carrier is moved from retracted position, said second cam means being adjusted in consonance with the adjustment of the micrometer screws.

5. An improvement in machines for cutting gear teeth including a support, a reciprocating cutter and a carrier movably mounted on the support and provided with a turnable gear blank carrying head, said improvement comprising, in combination, a spring stressing the carrier toward retracted position, mechanism including micrometer screws for arresting the travel of the carrier and for turning said head into a new tooth-cutting position, cam means for advancing the carrier with its head in the new position into the range of the cutter, a second cam means having a comparatively long straight portion and a follower constructed and arranged to oppose movement of said mechanism when the carrier is moved from retracted position, said second cam means being adjusted in consonance with the adjustment of the micrometer screws, and a bolt holding the head against rotation during movement of the carrier and releasing the head for turning movement as described, and said mechanism constructed and arranged to actuate the bolt.

WILLIAM F. H. BRAUN.

No references cited.